A. D. MARTIN.
SINK, BASIN, OR THE LIKE.
APPLICATION FILED OCT. 21, 1907.
907,261. Patented Dec. 22, 1908.
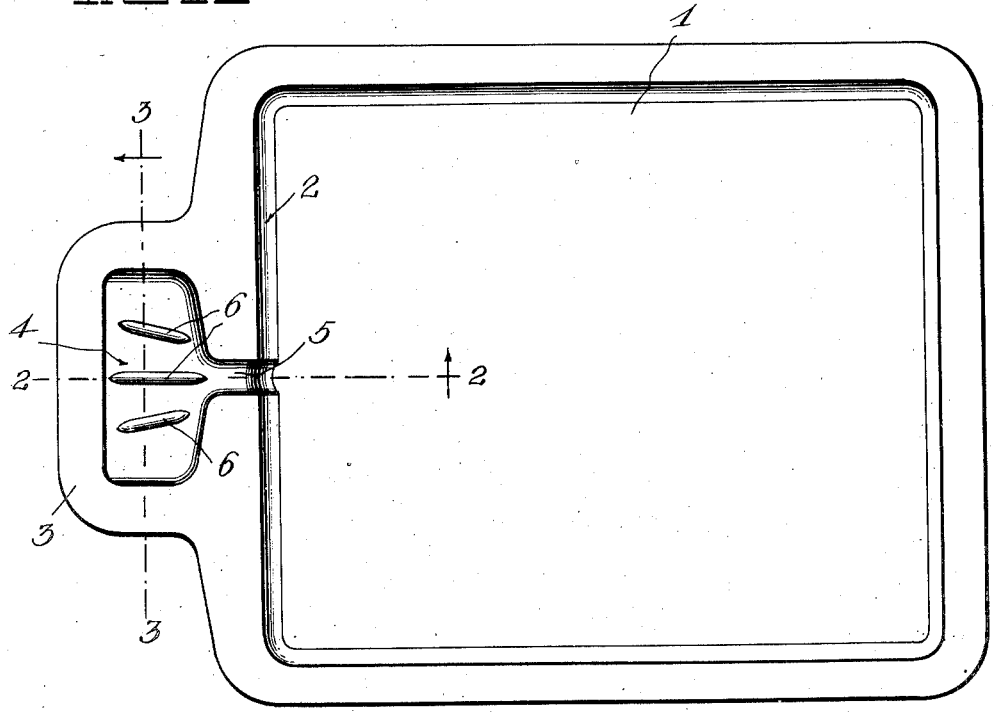
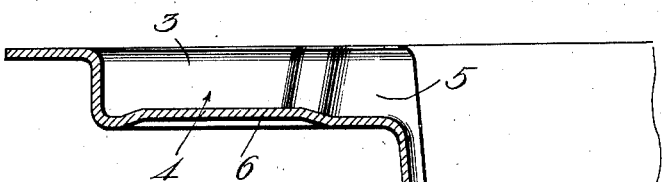
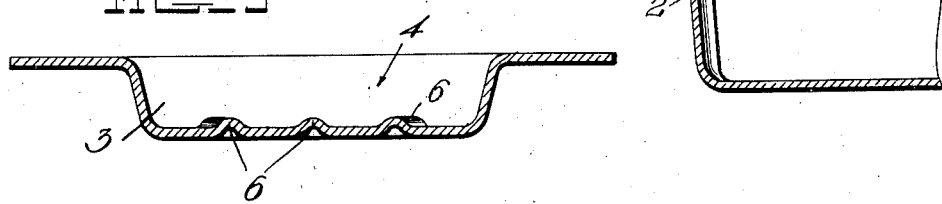
Witnesses
C. H. Griesbauer
Inventor
Anna D. Martin
by H. B. Willson & Co.
Attorneys

UNITED STATES PATENT OFFICE.

ANNA D. MARTIN, OF LANCASTER, OHIO.

SINK, BASIN, OR THE LIKE.

No. 907,261.    Specification of Letters Patent.    Patented Dec. 22, 1908.

Application filed October 21, 1907. Serial No. 398,479.

*To all whom it may concern:*

Be it known that I, ANNA D. MARTIN, a citizen of the United States, residing at Lancaster, in the county of Fairfield and State of Ohio, have invented certain new and useful Improvements in Sinks, Basins, or the Like; and I do declare the following to be a full, clear, and exact description of the invention, such as will enable others skilled in the art to which it appertains to make and use the same.

This invention has relation to new and useful improvements in sinks, basins, or the like; and has for its object to provide a sink, basin, bucket, foot-tub or other analogous device with a lateral extension, said extension being formed with a suitable depression for receiving a cake of soap, sponge, or other like article, and a channel leading from the depression for conducting any drip water back to the sink.

With the foregoing and other objects in view, the invention resides in the novel features of construction, its superior utility, and combination of parts illustrated in the drawings and particularly pointed out in the appended claim.

In the accompanying drawings:—Figure 1 is a top plan view of a sink provided with my improvements; Fig. 2 is a longitudinal section taken on the line 2—2 of Fig. 1; and Fig. 3 is a cross section taken on the line 3—3 of Fig. 1.

Referring to the drawings for a more particular description of the invention, 1 indicates a sink of common form.

In carrying out the invention, one wall of the sink, preferably one of the end walls 2, is formed with a longitudinal extension 3, said extension having a central longitudinal depression 4, of approximately rectangular form to receive a cake of soap, sponge or other like article, and having a central channel 5, leading from the inner side wall of said depression to conduct any drip water back into the sink. The depressed portion of said extension is also provided with a series of longitudinally spaced ribs 6, the central rib of which is located at a point opposite to and extends in a plane parallel with the channel 5, and the outer ribs of which converge toward the mouth of said channel. By this construction any waste or drip water is conducted directly to the mouth of the channel.

While I have shown and described the invention as applied to a sink as stated in the introductory remarks, it is evident that it may be applied to a washstand, tub or other analogous device.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as defined in the appended claim.

Having described my invention, I claim:

A sink having an extension projecting outwardly from one of its walls, said extension having a central approximately rectangular depression, constituting a soap receptacle, a central transverse channel leading from the inner side wall of the depressed portion of said extension to the sink, and a series of ribs which are spaced longitudinally and extend transversely of the depressed portion of the extension, said ribs being formed of elevated portions on the under surface of the extension, and certain of the ribs being inclined in a transverse plane towards the mouth of the channel.

In testimony whereof I have hereunto set my hand in presence of two subscribing witnesses.

ANNA D. MARTIN.

Witnesses:
  C. D. MARTIN,
  ANNA L. MARTIN.